United States Patent [19]
Marlowe

[11] Patent Number: 5,946,364
[45] Date of Patent: Aug. 31, 1999

[54] DENSIFICATION TEST PROCEDURE FOR URANIA

[75] Inventor: Mickey O. Marlowe, Wilmington, N.C.

[73] Assignee: General Electric Company, Schenectady, N.Y.

[21] Appl. No.: 09/160,443

[22] Filed: Sep. 25, 1998

[51] Int. Cl.$^6$ .................................................. G21C 17/06
[52] U.S. Cl. ............................................. 376/245; 376/901
[58] Field of Search ...................................... 376/245, 261, 376/409, 901; 264/0.5; 252/638; 423/261; 73/32 R, 149

[56] References Cited

U.S. PATENT DOCUMENTS

| 3,806,565 | 4/1974 | Langrod | 376/901 |
| 3,953,286 | 4/1976 | Watson et al. | 264/0.5 |
| 5,583,897 | 12/1996 | Hill | 376/245 |

*Primary Examiner*—Daniel D. Wasil
*Attorney, Agent, or Firm*—Nixon & Vanderhye

[57] ABSTRACT

An improved test for determining densification characteristics of nuclear fuel including a fissionable ceramic material is disclosed. The test includes controlling the testing atmosphere to impede loss through vaporization of silica and in turn density reduction due to compositional changes.

13 Claims, No Drawings

DENSIFICATION TEST PROCEDURE FOR URANIA

FIELD OF THE INVENTION

This invention relates to the evaluation of the densification of fissionable nuclear reactor fuel comprised at least in part of an oxide of uranium.

BACKGROUND OF THE INVENTION

Fissionable nuclear fuel for nuclear reactors typically comprises one of two principal chemical forms. One type consists of fissionable elements such as uranium, plutonium and thorium, and mixtures thereof, in metallic, non-oxide form. Specifically this category comprises uranium, plutonium, etc. metal and mixtures of these metals, namely alloys of such metals.

The other principal type of nuclear reactor fuel consists of ceramic or non-metallic oxides of fissionable and/or fertile elements comprising uranium, plutonium or thorium, and mixtures thereof. This category of ceramic or oxide fuels is disclosed, for example, in U.S. Pat. No. 4,200,492, issued Apr. 29, 1980, and U.S. Pat. No. 4,372,817, issued Feb. 8, 1983. Uranium oxides, especially uranium dioxide, has become the standard form of fissionable fuel in commercial nuclear power plants used for the generation of electrical power. However, minor amounts of other fissionable materials such as plutonium oxide and thorium oxide, and/or neutron absorbers, sometimes referred to as "poisons", such as gadolinium oxide, are sometimes admixed with the uranium oxide in the fuel product.

Uranium oxide fuel is generally produced by converting uranium hexafluoride or uranium metal to oxides of uranium. The process includes a series of chemical and physical operations, including pressure compacting uranium oxide in particulate form into handlable pellets or physically integrated bodies of suitable size and configuration, then sintering the resultant pellets or bodies of compacted particles. Sintering at high temperature coalesces the compacted particles of each pellet or body into an integrated unit of high density, and produces other desired effects such as manipulating the molecular oxygen content of the material and removal of residual undesirable impurities, e.g., fluorides.

Sintering processes are amply disclosed in the art, for example U.S. Pat. No. 3,375,306, issued Mar. 26, 1968; U.S. Pat. No. 3,872,022, issued Mar. 18, 1975; U.S. Pat. No. 3,883,623, issued May 13, 1975; U.S. Pat. No. 3,923,933, issued Dec. 2, 1975; U.S. Pat. No. 3,930,787, issued Jan. 6, 1976; U.S. Pat. No. 4,052,330, issued Oct. 4, 1977; and U.S. Pat. No. 4,348,339, issued Sep. 7, 1982.

Fissionable nuclear fuel materials for commercial power generating, water cooled and/or moderated reactors, commonly comprising pellets of uranium oxide, are typically enclosed within a sealed container formed of an alloy of zirconium metal, such as zircaloy -2 (U.S. Pat. No. 2,722, 964), or possibly stainless steel, to provide a fuel element. The container, sometimes referred to in the nuclear field as "cladding", generally comprises a tube-like or elongated enclosure housing fuel pellets stacked therein end-on-end to the extent of about ¾ of the length of the containers.

Fissionable fuel is enclosed and sealed in such containers for service in nuclear reactors to isolate it from contact with the coolant and/or liquid moderator. This precludes either any reaction between the fuel or fission products and the coolant or moderator media, or contamination of the coolant or moderator with escaping radioactive matter from the fuel or fission products.

Experience has shown that after extensive exposure to the radiation in the core of an operating nuclear reactor, typical fuel elements consisting of the fissionable fuel sealed within a metal container, are susceptible to failures due to breaching of their containers during rapid power increases. Fuel container breaching has been determined to be a result of a combination of conditions, namely stress imposed upon the metal by thermal expansion of the contained fuel, embrittlement of the metal by prolonged exposure to radiation and corrosion by the presence of accumulated fission products from the fuel enclosed therein.

Studies of this deleterious phenomenon have determined that these three conditions contribute to produce such a failure of the metal fuel container, which is commonly referred to in the art as "intergranular stress corrosion cracking". First, the metal must be susceptible to stress corrosion cracking in the irradiation environment; secondly, a level of physical stress must be present; and, thirdly, there must be exposure to aggressive corrosive agents. Metal failure due to stress corrosion cracking can be mitigated or even eliminated by alleviating any one or more of these three conditions.

One effective means for deterring such failures in conventional fuel elements comprising zirconium alloy containers housing uranium oxide fuel has been to include a metallurgically bonded barrier liner of unalloyed zirconium metal over the inner surface of the alloy container substrate. The unalloyed zirconium metal of the barrier liner is more resistant to irradiation embrittlement than the alloy substrate whereby it retains its initial relatively soft and plastic characteristics throughout its service life notwithstanding prolonged exposure to irradiations, etc. Localized physical stresses imposed on such a barrier lined fuel container by heat expanding fuel during rapid power increases are moderated by the plastic movement of the relatively soft unalloyed zirconium metal of the liner. Moreover, the unalloyed zirconium metal has been found to be less susceptible than alloys to the effects of corrosive fission products. That is, the unalloyed zirconium has resistance to the propagation of cracks in the presence of corrosive fission products.

The effectiveness of the unalloyed zirconium barrier liner in resisting the deleterious stress corrosion cracking phenomenon due to the interaction between the fuel pellets and the container in the presence of a corrosive environment of irradiation products, is achieved by mitigating the physical stress and stress corrosion crack propagation susceptibility of the zirconium barrier layer.

Effective unalloyed zirconium metal barrier linings for nuclear fuel elements comprising fuel pellets enclosed within a container are disclosed in U.S. Pat. No. 4,200,492 and No. 4,372,817.

Another approach to the problem of stress corrosion cracking as a cause of failure of fuel elements when subjected to frequent and drastic power increase has been to modify the physical properties of the uranium oxide fuel with the inclusion of additives. For example, aluminum silicates, derived from clays, when dispersed throughout the uranium oxide in amounts as low as a few tenths of one percent, have been demonstrated to be effective in increasing the plasticity of fuel pellets composed thereof, whereby the thermal expansion induced physical stress attributable to the fuel pellets is reduced. The aluminum silicate may also play a role in reducing the effectiveness and availability of the chemically aggressive fission products which promote stress corrosion cracking of the cladding tubes.

Aluminum silicate additives blended with uranium oxide have been found to be effective in eliminating or mitigating two of the three conditions which must be simultaneously present to produce stress corrosion failures in the metal of a fuel container. An aluminum silicate additive substantially increases the creep rate of fuel pellets comprising oxides of uranium and thereby reduces the stress imposed on the container due to thermal expansion of the fuel material. The enhanced plastic deformation and deformation rates attributable to this additive enables the modified fuel to flow into its own void volume within the interior of the fuel container, and thereby distribute the physical interaction force due to thermal expansion over a greater area. Thus high localized stresses are mitigated by increased distribution of their forces.

Moreover, the aluminum silicate introduced into the fuel material reacts with fission products produced during irradiation and accordingly reduces the concentration of aggressive fission products which, in the presence of physical stresses, are a cause of cracking in the metal of the fuel containers.

The effects of additives comprising aluminum silicates upon fissionable nuclear fuels, including their relative quantities, are disclosed in U.S. Pat. No. 3,679,596; No. 3,715,273; No. 3,826,754; No. 3,872,022; and No. 4,052,330.

However, experience in the processing or fabrication of aluminum silicate containing ceramic fuels comprising oxides of fissionable elements employing the conventional sintering procedures and conditions used for ceramic fuel has demonstrated the occurrence of distinctive shortcomings in the resulting products. Specifically it has been found that there occurs inconsistencies in the concentrations of aluminum silicate added and in achieving the final fuel densities desired.

The conventional sintering procedures and conditions commonly used in producing fuel with uranium oxides, such as disclosed in the foregoing patents, comprises employing reducing conditions to provide for an oxygen to metal ratio of the fuel material of near or at the desired stoichiometric composition of oxygen to metal ratio O/M=2.00 ($UO_2$) during and following the sintering operation. For example, hydrogen or cracked ammonia sintering atmospheres with relatively low dew points, such as <10 degrees C., or hydrogen/carbon dioxide gas mixtures or carbon monoxide/carbon dioxide gas mixtures with their ratios proportionally adjusted to produce near the stoichiometric compositions are typically used in sintering.

Reducing conditions with high sintering temperatures, such as about 1700 degrees C. or higher result in a relatively high vapor pressure of silicon monoxide (SiO) over silicon dioxide ($SiO_2$) and aluminosilicate, amounting to as much as a few tenths of an atmosphere. See for instance "Graphical Displays of the Thermodynamics of High-Temperature Gas-Solid Reactions and Their Application to Oxidation of Metals and Evaporation of Oxides" by Lou et al, *Journal of the American Ceramic Society*, Vol. 68, No. 2 February 1985, pages 49–58.

Due to such high SiO vapor pressures, there is considerable volatilization of the silica bearing material from a uranium oxide material such as a fissionable fuel composition containing an aluminosilicate or silica bearing phase. Such a loss of silica material presents difficulties in controlling the amount of silica containing additives present in a fuel product. Moreover, because of the high vapor pressure of SiO over the silica containing additive phase, pores or voids formed within the additive phase are stabilized and achieving the desired final density is inhibited.

The disclosed contents of the foregoing U.S. Pat. namely No. 3,375,306; No. 3,679,596; No. 3,715,273; No. 3,826,754; No. 3,872,022; No. 3,883,623; No. 3,923,933; No. 3,930,787; No. 4,052,330; No. 4,348,339; No. 4,578,229; No. 4,200,492; and No. 4,372,817, which illustrate the state of the art relevant to the invention disclosed and claimed herein, are each incorporated herein by reference.

SUMMARY OF THE INVENTION

This invention comprises an improved method of testing nuclear fuel products comprising an oxide of uranium which may typically incorporate a silica-containing additive. The invention includes a high temperature test procedure for determining density changes wherein the atmospheric composition is regulated to inhibit losses of silica-containing additive which may be present.

OBJECTS OF THE INVENTION

It is a primary object of this invention to provide an improved test procedure for evaluating densification of a fissionable nuclear fuel product comprising an oxide of uranium.

It is also an object of this invention to provide an improved test comprising thermal treatment of a nuclear fuel composition of an oxide of uranium and a silica-containing additive for use in the manufacture of fissionable fuel products.

It is a further object of this invention to provide a test procedure for use in the manufacture of nuclear fuel comprising uranium oxide with a silica-containing additive which inhibits composition changes due to a loss of the silica-containing additive during thermal treatment.

It is an additional object of this invention to provide a method for testing nuclear fuel comprising uranium oxide with an aluminum silicate additive which enables a determination of the product density changes during service within a nuclear reactor.

It is a still further object of this invention to provide a means of impeding loss of SiO and in turn unwanted compositional changes during density evaluations which include thermal treatment.

DETAILED DESCRIPTION OF THE INVENTION

This invention deals with nuclear fuel products produced from fissionable materials comprising oxides of uranium which may include a silica-containing additive such as disclosed in the above patents. The fissionable material, in addition to the uranium oxide and silica-containing additive (if present), can also include oxides of plutonium or thorium, neutron absorbers or "poisons" such as gadolinia, and combinations thereof, among other ingredients disclosed in the above cited prior art. The oxides of uranium and other fissionable ceramics are preferably of an oxygen to metal ratio (O/M) of approximately 2.00, namely substantially composed of uranium dioxide ($UO_2$).

The silica-containing additives, likewise include those disclosed, and their amounts, as given in the above-cited patents. Specific silica containing additives include silicon dioxide ($SiO_2$), aluminum silicates ($Al_2O_3.SiO_2$) and derivatives thereof, including natural clays such as mullite ($3Al_2O_3.2SiO_2$) pyrophillites ($Al_2O_3.4SiO_2$), kaolinite ($Al_2O_3(Si_2O_3)).(OH)_4$), andalusite ($Al_2SiO_3$), sillimanite ($Al_2SiO_5$), and cyanite ($Al_2SiO_5$), for example. Mixtures of alumina powder and silica powder may also be employed.

Alternatively, it is possible to introduce each of the silicon and aluminum as a compound which decomposes to silica and alumina under the conditions of sintering. For example, the aluminum, or at least a portion of it, may be added as an organoaluminum compound, such as for example aluminum bistearate, diethylaluminum malonate or triphenyl aluminum. The aluminum compound, especially the bistearate, would act as a pressing die lubricant, and leave alumina when the hydrocarbon portion is volatilized. An organosilicon compound may be used for the silica addition, such as for example a volatile silicon compound that will vaporize early in the sintering process. Examples include silicobenzoic acid, triethylphenylsilicane, ethyltriphenylsilicane and methyltriphenyl silicane. The organosilicon compound would produce the fugitive silicon which would be converted to silica in the sintering furnace, and would act as a pore former to control the density and structure of the sintered pellets.

Amounts of the silica-containing additives comprise, for example, about 0.025 percent up to about 1.0 percent by weight of the overall fuel material.

With the sintering conditions commonly employed in the manufacture of uranium oxide fuel, the vapor pressure of SiO is strongly dependent upon temperature and oxygen free energy. For example, at 1700 degrees C., the SiO vapor pressure can range from approximately $10^{-6}$ (0.000001) to $10^{-1}$ (0.10) atmospheres, note "Review-Graphic Displays of the Thermodynamics of High Temperature Gas-Solid Reactions and Their Application to Oxidation of Metals and Evaporation of Oxides", by Lou et al, supra. At the typical sintering conditions used for urania-based nuclear fuels, about 1700–1800 degrees C., the vapor pressure of SiO is near $10^{-2}$ (0.01) atmospheres. Under such conditions, there can occur a considerable loss of any silica bearing material.

As reported in detail by R. O. Meyer, in "The Analysis of Fuel Densification", U.S. Nuclear Regulatory Commission, Report NUREG-0085, July 1976, due to the occurrence of fuel containers flattening or collapsing in reactor service, an effort was made to evaluate an observed phenomenon of fuel densification, or shrinkage. This undertaking resulted in a test procedure for nuclear fuel to evaluate the potential of a given fuel product for densification or shrinkage during operation in-reactor.

The densification evaluation test procedure which evolved for simulating in reactor densification, and as described in the above Meyer's article, briefly comprises heat treating produced fuel specimens (pellet samples of fuel products) at a temperature of 1700 degrees C. (3092 degrees F.) for 24 hours in dry hydrogen, or low dew point (for example <10° C.) atmosphere.

Efforts in undertaking to apply this standardized densification test procedure to aluminosilicate containing ceramic fuels have demonstrated that there are unique problems which generally prevent the obtaining of meaningful test results. The test specimens commonly exhibited significant losses in weight, and occasionally actually increases in volume during the procedure, rather than showing the expected densification.

The standard thermal simulation test procedure and conditions for a ceramic fuel comprising uranium oxide based fuel products comprised providing relatively reducing conditions to maintain the oxygen to uranium ratio (O/U) of the fuel material at or near the stoichiometric composition of uranium dioxide (O/U=2.00) during the testing. It has been determined that under the high temperature (about 1700 degrees C.) reducing conditions, the vapor pressure of silicon oxide (SiO) over silicon dioxide ($SiO_2$) and aluminosilicates is quite high, amounting to as much as several tenths of an atmosphere. Due to this high vapor pressure there occurs considerable volatilization of the silica bearing material from the uranium oxide fuel containing an aluminosilicate or silica phase. This volatilization phenomenon causes the observed weight loss while carrying out the densification test procedure with an aluminosilicate containing fuel. Moreover, due to the high vapor pressure of the silica oxide (SiO) over the additive phase, pores within the additive phase are stabilized and may even grow, thereby producing the observed swelling of fuel during the test and confounding the test results.

The vapor pressure of silica oxide (SiO) has been determined to be significantly dependent upon ambient temperature and oxygen free energy. For instance, at 1700 degrees C. the silica oxide (SiO) vapor pressure can range from approximately 0.000001 to 0.1 atmospheres as noted above. At the thermal simulation test conditions used for assessing the resistance of uranium oxide based nuclear fuel to in-reactor service conditions, the vapor pressure of silica oxide (SiO) is near the highest possible value at 1700 degrees C.

In accordance with this invention, the subject thermal simulation testing of uranium oxide fuel containing an aluminosilicate or silica phase for ascertaining its resistance to densification when in reactor service, is carried out while increasing the oxygen free energy a significant degree, namely several kilocalories/mole, thereby reducing the equilibrium vapor pressure of SiO by several orders of magnitude. For instance, when the partial molar free energy of oxygen during the thermal simulating test for ascertaining resistance of the fuel to densification during in-reactor service, is increased to about −80 kilocalories per mole or more, the silica oxide (SiO) vapor pressure while performing the test at 1700 degrees C. is decreased from nearly 0.1 atmospheres down to only about 0.0001 atmospheres or less. The rate of evaporation of the silica oxide (SiO) from the fuel composition, in turn is similarly reduced by about three orders of magnitude or more, thereby effectively eliminating the weight loss deficiency in performing the test.

Additionally, the low SiO vapor pressure eliminates stabilization and growth of pores within the pellet or body of compacted and sintered particulate uranium oxide fuel containing a silica phase due to internal pressurization. Thus the confounding effect of testing aluminosilicate containing uranium oxide based fuel material is overcome.

The preferred conditions for the practice of this invention comprise carrying out the thermal simulation test procedure for uranium oxide based nuclear fuel materials containing silicon dioxide or aluminum silicate additives in an atmosphere which produces a low SiO vapor pressure by providing and maintaining the partial molar free energy of oxygen therein of greater than −90 kilocalories per mole.

Oxygen partial molar free energy can be regulated by manipulating the gas composition of the testing atmosphere such as by applying specific gases and or by proportioning the ratios of mixtures of gases. For example, the testing atmosphere conditions can be achieved through the application of wet hydrogen, wet cracked ammonia, mixtures of carbon monoxide/carbon dioxide gases and mixtures of hydrogen/carbon dioxide gases in appropriate ratios for the selected test temperature and gas atmosphere.

Preferred testing temperatures for the practice of this invention comprise a range of from about 1700 degrees C. (3092 degrees F.) up to about 2200 degrees C. (3992 degrees F.).

The invention will now be described with reference to the following non-limiting example.

EXAMPLE

A particular example of practicing this invention is as follows.

Sintering uranium dioxide nuclear fuel pellets, in the form of right circular cylinders and containing 0.25 wt % of alumina/silica in the ratio of 0.4 $Al_2O_3$/0.6 $SiO_2$ are prepared by blending alumina and silica powders in a weight ratio of 0.4 $Al_2O_3$/0.6 $SiO_2$ with uranium dioxide powder to achieve a total addition of 0.25 wt % of the alumina/silica with 99.75% uranium dioxide. The blended powders are dry-pressed to a green density of approximately 5.6 gm/cm$^3$ to form powder compacts in the form of right circular cylinders for sintering to fuel pellets.

The dry pressed pellets are sintered using a furnace feed gas of 75% hydrogen –25% nitrogen which has been moisturized by passing the gas through a water bubbler with the temperature of the water in the bubbler maintained at 55° C. and a total furnace gas pressure of 1 atmosphere (760 mm Hg). At 55° C., the vapor pressure of water is 118 mm Hg, the hydrogen and nitrogen gas pressures of the furnace feed gas are 481.5 and 160.5 mm Hg, respectively, and the $H_2O$ to $H_2$ ratio of the furnace gas atmosphere is 118/481.5= 0.245.

The sintering furnace temperature profile is maintained to provide prolonged (~4 hours) sintering at 1750° C. in the hot or working zone of the sintering furnace. At that sintering temperature, for the $H_2O$ to $H_2$ ratio noted above, the oxygen free energy in the hot zone of the sintering furnace is maintained at about –70 kcal/mole, the O/U ratio of the uranium oxide during the sintering operation is maintained at about 2.005, and the vapor pressure of SiO is maintained at about $10^{-5}$ (0.00001) atmospheres. For these sintering conditions, the desired final fuel pellet density of 10.5 gm/cm$^3$ is achieved, and the aluminum and silicon content of the final sintered pellets are within acceptable ranges of the initial amount added.

The sintered pellets are tested for resistance to density changes by maintaining them in the temperature range 1700–1725° C. with a furnace feed gas of 75% hydrogen–25% nitrogen which has been moisturized by passing the gas through a water bubbler with the temperature of the water in the bubbler maintained at 55° C. and a total furnace gas pressure of 1 atmosphere (760 mm Hg). At 55° C., the vapor pressure of water is 118 mm Hg, the hydrogen and nitrogen gas pressures of the furnace feed gas are 481.5 and 160.5 mm Hg, respectively, and the $H_2O$ to $H_2$ ratio of the furnace gas atmosphere is 118/481.5=0.245.

At that test temperature, for the $H_2O$ to $H_2$ ratio noted above, the oxygen free energy in the hot zone of the testing furnace is maintained at about –70 kcal/mole, the O/U ratio of the uranium oxide during the sintering operation is maintained at about 2.005, and the vapor pressure of SiO is maintained at about $10^{-5}$ (0.00001) atmospheres. During cooling, in this test atmosphere, the O/U ratio of the uranium oxide re-equilibrates to near 2.000.

For these test conditions, the desired final fuel pellet weight loss of the pellets as a result of SiO loss is negligible, and the density changes are essentially only a result of pore volume elimination from continuation of the sintering process.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for evaluating the densification characteristics of fissionable nuclear reactor fuel comprised of uranium dioxide, comprising the steps of:

heating sintered pellets of uranium dioxide containing fissionable fuel at a temperature of at least about 1700° C. for a period of at least about 24 hours in a controlled atmosphere;

providing and maintaining a partial molar free energy of oxygen greater than about –90 kilocalories per mole; and determining any density changes in the pellets attributable to the heating for ascertaining the shrinkage potential of the fuel pellets in nuclear reactor service.

2. The method for evaluating the densification characteristics of fissionable nuclear reactor fuel of claim 1, wherein the sintered uranium dioxide containing fuel pellet contains a silica-containing additive.

3. The method for evaluating the densification characteristics of fissionable nuclear reactor fuel of claim 1, wherein the sintered uranium dioxide containing fuel pellet contains an aluminosilicate compound.

4. The method for evaluating the densification characteristics of fissionable nuclear reactor fuel of claim 1, wherein the sintered uranium dioxide containing fuel pellet is fabricated by addition of a silica-containing additive to the uranium dioxide containing particulate material prior to compaction and sintering of the fuel pellet.

5. The method for evaluating the densification characteristics of fissionable nuclear reactor fuel of claim 1, wherein the sintered uranium dioxide containing fuel pellet is fabricated by addition of an aluminosilicate clay to the uranium dioxide containing particulate material prior to compaction and sintering of the fuel pellet.

6. The method for evaluating the densification characteristics of fissionable nuclear reactor fuel of claim 1, wherein the particulate oxide of uranium undergoing sintering contains a compound which converts to alumina during sintering.

7. The method of for evaluating the densification characteristics of fissionable nuclear reactor fuel of claim 6, wherein the compound which converts to alumina during sintering is selected from aluminum bistearate, diethylaluminum malonate and triphenyl aluminum.

8. The method for evaluating the densification characteristics of fissionable nuclear reactor fuel of claim 1, wherein the particulate oxide of uranium undergoing sintering contains a compound which converts to silica during sintering.

9. The method for evaluating the densification characteristics of fissionable nuclear reactor fuel of claim 8, wherein the compound which converts to silica during sintering is selected from silicobenzoic acid, triethylphenyl silicane, methyltriphenyl silicane and ethyltriphenyl silicane.

10. A method for evaluating the densification characteristics of fissionable nuclear reactor fuel comprising uranium dioxide containing a silica-containing additive which has been compacted into pellets and sintered for the purpose of controlling shrinkage of such fuel pellets during service within a nuclear reactor, comprising the steps of:

heating compacted and sintered pellets fabricated from particulate uranium dioxide containing a silica constituent at a temperature of at least about 1700° C. for a period of at least about 24 hours in a controlled atmosphere containing oxygen which is increased to and maintained at a partial pressure providing a partial mole free energy of the oxygen content greater then −90 kilocalories per mole of oxygen; and determining any density changes in the pellets attributable to the heating for ascertaining the shrinkage potential of the fuel pellets in nuclear reactor service.

11. The method of evaluating the densification characteristics of nuclear reactor fissionable fuel of claim 10, wherein the particulate uranium dioxide containing a silica constituent is heated in an atmosphere containing sufficient oxygen to avoid reduction to SiO and volatilization.

12. A method for evaluating the densification characteristics of fissionable nuclear reactor fuel comprising particulate uranium dioxide containing a silica constituent which has been compacted into pellets and sintered for the purpose of controlling shrinkage of such fuel pellets during service within a nuclear reactor, comprising the steps of:

heating compacted and sintered pellets fabricated from particulate uranium dioxide containing a silica constituent at a temperature of at least about 1700° C. up to about 2200° C. for a period of at least about 24 hours in a controlled atmosphere containing oxygen maintained at a partial molar free energy of the oxygen content greater than −90 kilocalories per mole of oxygen; and determining any density changes in the pellets attributable to the heating for ascertaining the shrinkage potential of the fuel pellets in nuclear reactor service.

13. The method of evaluating the densification characteristics of nuclear reactor fissionable fuel of claim 12, wherein the particulate uranium dioxide is fabricated by addition of an aluminosilicate clay or derivative thereof to the uranium dioxide.

* * * * *